(12) United States Patent
Wong et al.

(10) Patent No.: US 8,595,424 B2
(45) Date of Patent: *Nov. 26, 2013

(54) CLUSTER BASED NON-VOLATILE MEMORY TRANSLATION LAYER

(71) Applicant: Micron Technology, Inc., Boise, ID (US)

(72) Inventors: Wanmo Wong, Menlo Park, CA (US); Mark Jahn, Hollister, CA (US); Frank Sepulveda, Hollister, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,213

(22) Filed: Feb. 11, 2013

(65) Prior Publication Data

US 2013/0151765 A1  Jun. 13, 2013

Related U.S. Application Data

(63) Continuation of application No. 12/372,405, filed on Feb. 17, 2009, now Pat. No. 8,375,157, which is a continuation of application No. 10/933,017, filed on Sep. 2, 2004, now abandoned.

(51) Int. Cl.
*G06F 12/00* (2006.01)

(52) U.S. Cl.
USPC ............ 711/103; 711/111; 711/154; 711/170

(58) Field of Classification Search
USPC .......................... 711/103, 111, 154, 170, 172
See application file for complete search history.

(56) References Cited

U.S. PATENT DOCUMENTS

| | | |
|---|---|---|
| 5,590,300 A | 12/1996 | Lautzenheiser |
| 5,930,832 A | 7/1999 | Heaslip |
| 6,026,463 A | 2/2000 | Klein |
| 6,069,638 A | 5/2000 | Porterfield |
| 6,088,778 A | 7/2000 | Ruff et al. |
| 6,249,853 B1 | 6/2001 | Porterfield |
| 6,330,654 B1 | 12/2001 | LaBerge |
| 6,346,946 B1 | 2/2002 | Jeddeloh |
| 6,418,523 B2 | 7/2002 | Porterfield |
| 6,449,679 B2 | 9/2002 | Ryan |
| 6,625,715 B1 | 9/2003 | Mathews |
| 7,334,108 B1 | 2/2008 | Case |
| 2003/0046482 A1 | 3/2003 | Venkiteswaran |
| 2004/0030847 A1 | 2/2004 | Tremaine |
| 2005/0286336 A1 | 12/2005 | Harari |

*Primary Examiner* — Midys Rojas
(74) *Attorney, Agent, or Firm* — Leffert Jay & Polglaze, P.A.

(57) ABSTRACT

Methods of operating non-volatile memory devices including dividing the non-volatile memory device into a plurality of sequentially addressed clusters, wherein each cluster contains a plurality of sequentially addressed logical blocks, and where at least one cluster of the plurality of sequentially addressed clusters addresses a different number of sequentially addressed logical blocks than another one of the clusters of the plurality of sequentially addressed clusters.

20 Claims, 7 Drawing Sheets

CLUSTER BASED NON-VOLATILE MEMORY TRANSLATION LAYER

RELATED APPLICATIONS

This is a continuation application of U.S. patent application Ser. No. 12/372,405 (allowed), filed Feb. 17, 2009, titled "CLUSTER BASED NON-VOLATILE MEMORY TRANSLATION LAYER", which is a continuation application of U.S. patent application Ser. No. 10/933,017, filed Sep. 2, 2004, (abandoned) which is commonly assigned, the entire contents of which are incorporated herein by reference.

TECHNICAL FIELD

The present invention relates generally to integrated circuits and in particular the present invention relates to sector address translation of non-volatile memory devices.

BACKGROUND

Memory devices are typically provided as internal storage areas in the computer. The term memory identifies data storage that comes in the form of integrated circuit chips. There are several different types of memory used in modern electronics, one common type is RAM (random-access memory). RAM is characteristically found in use as main memory in a computer environment. RAM refers to read and write memory; that is, you can both write data into RAM and read data from RAM. This is in contrast to ROM, which permits you only to read data. Most RAM is volatile, which means that it requires a steady flow of electricity to maintain its contents. As soon as the power is turned off, whatever data was in RAM is lost.

Computers almost always contain a small amount of read-only memory (ROM) that holds instructions for starting up the computer. Unlike RAM, ROM cannot be written to. An EEPROM (electrically erasable programmable read-only memory) is a special type non-volatile ROM that can be erased by exposing it to an electrical charge. EEPROM comprise a large number of memory cells having electrically isolated gates (floating gates). Data is stored in the memory cells in the form of charge on the floating gates. Charge is transported to or removed from the floating gates by specialized programming and erase operations, respectively.

Yet another type of non-volatile memory is a Flash memory. A Flash memory is a type of EEPROM that can be erased and reprogrammed in blocks instead of one byte at a time. A typical Flash memory comprises a memory array, which includes a large number of memory cells. Each of the memory cells includes a floating gate field-effect transistor capable of holding a charge. The data in a cell is determined by the presence or absence of the charge in the floating gate. The cells are usually grouped into sections called "erase blocks." The memory cells of a Flash memory array are typically arranged into a "NOR" architecture (the cells arranged in an array of rows and columns, each cell directly coupled to a bitline) or a "NAND" architecture (cells coupled into "strings" of cells, such that each cell is coupled indirectly to a bitline and requires activating the other cells of the string for access). Each of the cells within an erase block can be electrically programmed in a random basis by charging the floating gate. The charge can be removed from the floating gate by a block erase operation, wherein all floating gate memory cells in the erase block are erased in a single operation.

Because all the cells in an erase block of a Flash memory device must be erased all at once, one cannot directly rewrite a Flash memory cell without first engaging in a block erase operation. Erase block management (EBM) provides an abstraction layer for this to the host, allowing the Flash device to appear as a freely rewrite-able device. Erase block management also allows for load leveling of the internal floating gate memory cells to help prevent write fatigue failure. Write fatigue is where the floating gate memory cell, after repetitive writes and erasures, no longer properly erases and removes charge from the floating gate. Load leveling procedures increase the mean time between failure of the erase block and Flash memory device as a whole.

In many modern Flash memory devices implementations, the host interface and/or erase block management routines additionally allow the Flash memory device to appear as a read/write mass storage device (i.e., a magnetic disk) to the host, storing data in the Flash memory in 512-byte sectors. As stated above, the erase block management routines along with the address translation layer provide the necessary linkage between the host and the internal Flash memory device erase block array; logically mapping logical sectors to physical sectors on the Flash device and managing block erasure.

To accomplish this mapping of a logical sector to a physical sector in the Flash memory of the prior art, either a table is kept in RAM or the physical sectors are scanned for the physical sector that contains the requested logical sector address. With the data storage capacity of modern Flash memories increasing issues are being caused with the size of the required RAM table and/or the time required to scan the Flash memory for the requested sector. This is particularly an important issue in resource limited handheld or embedded devices.

For the reasons stated above, and for other reasons stated below which will become apparent to those skilled in the art upon reading and understanding the present specification, there is a need in the art for a Flash memory device and/or erase block management with improved logical to physical sector mapping.

DETAILED DESCRIPTION

Figure 1A:
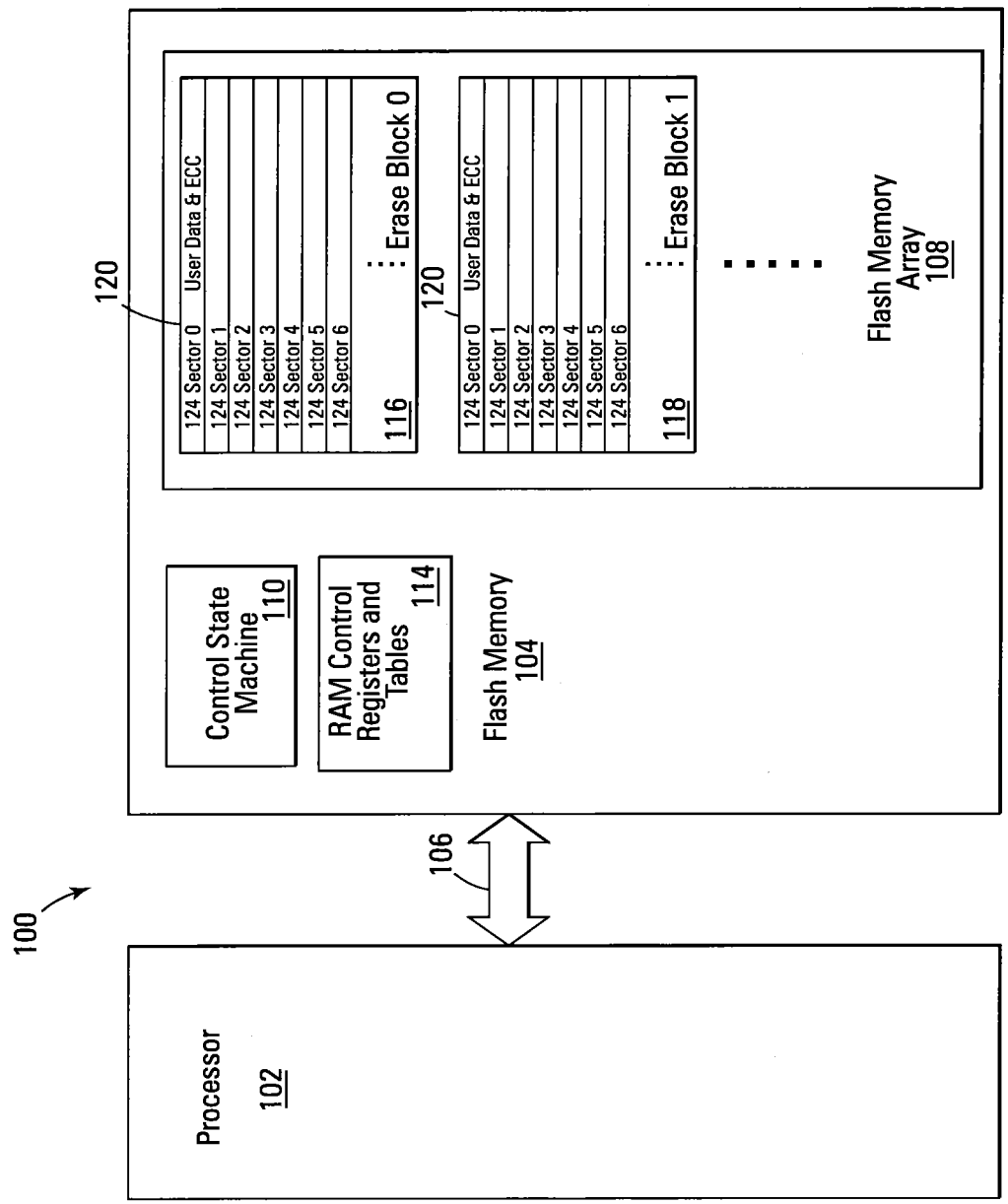
FIGS. 1A and 1B detail memory systems with memory and memory controllers in accordance with embodiments of the present invention.

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

To overcome the reliance on conventional logical block to physical block RAM address translation tables or physical block scans with the above detailed issues of large RAM footprints and/or time consuming physical scans a non-volatile memory of the present invention manages logical block address translation in a cluster based approach. The cluster based address translation approach allows a non-volatile or Flash memory embodiment of the present invention to translate cluster based logical block addresses to physical block addresses, wherein each cluster contains a plurality of sequentially addressed logical blocks. This allows for a smaller logical cluster to physical cluster address translation RAM look up table or faster physical scan of the physical cluster addresses of the non-volatile memory device or subsystem resulting in an improved performance. As stated above, the translation of logical blocks/sectors to the physical blocks/sectors by a controller and/or software/firmware is necessary for a non-volatile memory to appear as a freely rewriteable device to the system or processor that it is coupled to. The controller or firmware responsible for this translation is called the translation layer (TL). In one embodiment, variable cluster granularity (an adjustable number of blocks/sectors per cluster) allows the non-volatile memory storage to closely match the access types and data that will be stored in it. In another embodiment of the present invention, a specially formatted cluster is utilized for frequently updated sectors/logical blocks, where the special cluster stores a single sector/logical block and new sequential physical sectors/blocks of the cluster is written in turn with each new update of the logical block and the previous physical block holding the old data invalidated until the entire cluster has been used. This allows multiple updates of a logical sector without having to move then invalidate and/or erase the cluster containing the old data.

As stated above, because all the cells in an erase block of a non-volatile memory device, and in particular, a Flash memory device are generally erased all at once, one cannot directly rewrite a memory cell without first engaging in a block erase operation. Erase Block Management (EBM), typically under the control of an internal state machine, an external memory controller, or software driver, provides an abstraction layer for this to the host (a system, a processor or an external memory controller), allowing the non-volatile device to appear as a freely rewriteable device, including, but not limited to, managing the logical address to physical address translation mapping with the translation layer, the assignment of erased and available erase blocks for utilization, and the scheduling erase blocks that have been used and closed out for block erasure. Erase block management also allows for load leveling of the internal floating gate memory cells to help prevent write fatigue failure. Write fatigue is where the floating gate memory cell, after repetitive writes and erasures, no longer properly erases and removes charge from the floating gate. Load leveling procedures increase the mean time between failure of the erase block and non-volatile/Flash memory device as a whole.

As stated above, two common types of Flash memory array architectures are the "NAND" and "NOR" architectures, so called for the resemblance which the basic memory cell configuration of each architecture has to a basic NAND or NOR gate circuit, respectively. Other types of non-volatile memory include, but are not limited to, Polymer Memory, Ferroelectric Random Access Memory (FeRAM), Ovionics Unified Memory (OUM), Nitride Read Only Memory (NROM), and Magnetoresistive Random Access Memory (MRAM).

In the NOR Flash memory array architecture, the floating gate memory cells of the memory array are arranged in a matrix. The gates of each floating gate memory cell of the array matrix are connected by rows to word select lines (word lines) and their drains are connected to column bit lines. The source of each floating gate memory cell is typically connected to a common source line. The NOR architecture floating gate memory array is accessed by a row decoder activating a row of floating gate memory cells by selecting the word line connected to their gates. The row of selected memory cells then place their stored data values on the column bit lines by flowing a differing current if in a programmed state or not programmed state from the connected source line to the connected column bit lines.

A NAND Flash memory array architecture also arranges its array of floating gate memory cells in a matrix such that the gates of each floating gate memory cell of the array are connected by rows to word lines. However each memory cell is not directly connected to a source line and a column bit line. Instead, the memory cells of the array are arranged together in strings, typically of 8, 16, or more each, where the memory cells in the string are connected together in series, source to drain, between a common source line and a column bit line. The NAND architecture floating gate memory array is then accessed by a row decoder activating a row of floating gate memory cells by selecting the word select line connected to their gates. In addition, the word lines connected to the gates of the unselected memory cells of each string are also driven. However, the unselected memory cells of each string are typically driven by a higher gate voltage so as to operate them as pass transistors and allowing them to pass current in a manner that is unrestricted by their stored data values. Current then flows from the source line to the column bit line through each floating gate memory cell of the series connected string, restricted only by the memory cells of each string that are selected to be read. Thereby placing the current encoded stored data values of the row of selected memory cells on the column bit lines.

Many of the modern computer operating systems, such as "DOS" (Disk Operating System), were developed to support the physical characteristics of hard drive structures; supporting file structures based on heads, cylinders and sectors. The DOS software stores and retrieves data based on these physical attributes. Magnetic hard disk drives operate by storing polarities on magnetic material. This material is able to be rewritten quickly and as often as desired. These characteristics have allowed DOS to develop a file structure that stores files at a given location, which is updated by a rewrite of that location as information is changed. Essentially all locations in DOS are viewed as fixed and do not change over the life of the disk drive being used therewith, and are easily updated by rewrites of the smallest supported block of this structure. A sector (of a magnetic disk drive) is the smallest unit of storage that the DOS operating system supports. In particular, a logical block or sector (referred to herein as a logical block) has come to mean 512 bytes of information for DOS and most other operating systems in existence. Flash and other non-volatile memory systems that emulate the storage characteristics of hard disk drives are preferably structured to support storage in 512 byte blocks along with additional storage for overhead associated with mass storage, such as ECC bits, status flags for the sector or erase block, and/or redundant bits.

In many modern Flash memory device implementations, the controller and/or software routines additionally allow the Flash memory device or a memory subsystem of Flash memory devices to appear as a read/write mass storage device (i.e., a magnetic disk) to the host by conforming the interface to the Flash memory to be identical to a standard interface for a conventional magnetic hard disk drive. This allows the Flash memory device to appear as a block read/write mass storage device or disk. This approach has been codified by the Personal Computer Memory Card International Association (PCMCIA), Compact Flash (CF), and Multimedia Card (MMC) standardization committees, which have each promulgated a standard for supporting Flash memory systems or Flash memory "cards" with a hard disk drive protocol. A Flash memory device or Flash memory card (including one or more Flash memory array chips) whose interface meets these standards can be plugged into a host system having a standard DOS or compatible operating system with a Personal Computer Memory Card International Association-Advanced Technology Attachment (PCMCIA-ATA) or standard ATA interface. Other additional Flash memory based mass storage devices of differing low level formats and interfaces also exist, such as Universal Serial Bus (USB) Flash drives.

The software routines that initialize and operate a device, such as a memory controller or a non-volatile memory device or subsystem are collectively referred to as firmware or ROM after the non-volatile read only memory (ROM) machine usable storage device on which such routines have historically been stored. It is noted that such firmware or ROM routines are stored on a variety of machine usable storage mediums that include, but are not limited to, a non-volatile Flash memory, a read only memory (ROM), an electrically erasable programmable read only memory (EEPROM), a one time programmable (OTP) device, a complex programmable logic device (CPLD), a memory controller, an application specific integrated circuit (ASIC), a CD-ROM, a magnetic media disk, etc.

FIG. 1A is a simplified diagram of a system 100 that incorporates a Flash memory device 104 embodiment of the present invention. In the system 100 of FIG. 1A, the Flash memory 104 is coupled to a processor 102 with an address/data bus 106. Internally to the Flash memory device, a control state machine 110 directs internal operation of the Flash memory device; managing the Flash memory array 108 and updating control registers and tables 114. The Flash memory array 108 contains floating gate memory cells arranged in a sequence of erase blocks 116, 118. Each erase block 116, 118 contains a series of physical pages or rows 120, each page containing physical storage for one or more logical sectors or blocks 124 (shown here for illustration purposes as a single logical sector/block 124 per physical page/row 120) that contain a user data space and a control/overhead data space. The overhead data space contains overhead information for operation of the logical block 124, such as an error correction code (not shown), status flags, or an erase block management data field area (not shown). The user data space in each logical block 124 is typically 512 bytes long. It is noted that other interfaces to the Flash memory 104 and formats for the erase blocks 116, 118, physical pages 120, and logical sectors/blocks 124 are possible and should be apparent to those skilled in the art with benefit of the present disclosure. It is also noted that additional Flash memory devices 104 may be incorporated into the system 100 as required. In FIG. 1A, the logical blocks are arranged in clusters and address translation of the logical block address to physical block address in the Flash memory 104 utilizes cluster based address translation incorporating embodiments of the present invention.

Figure 1B:
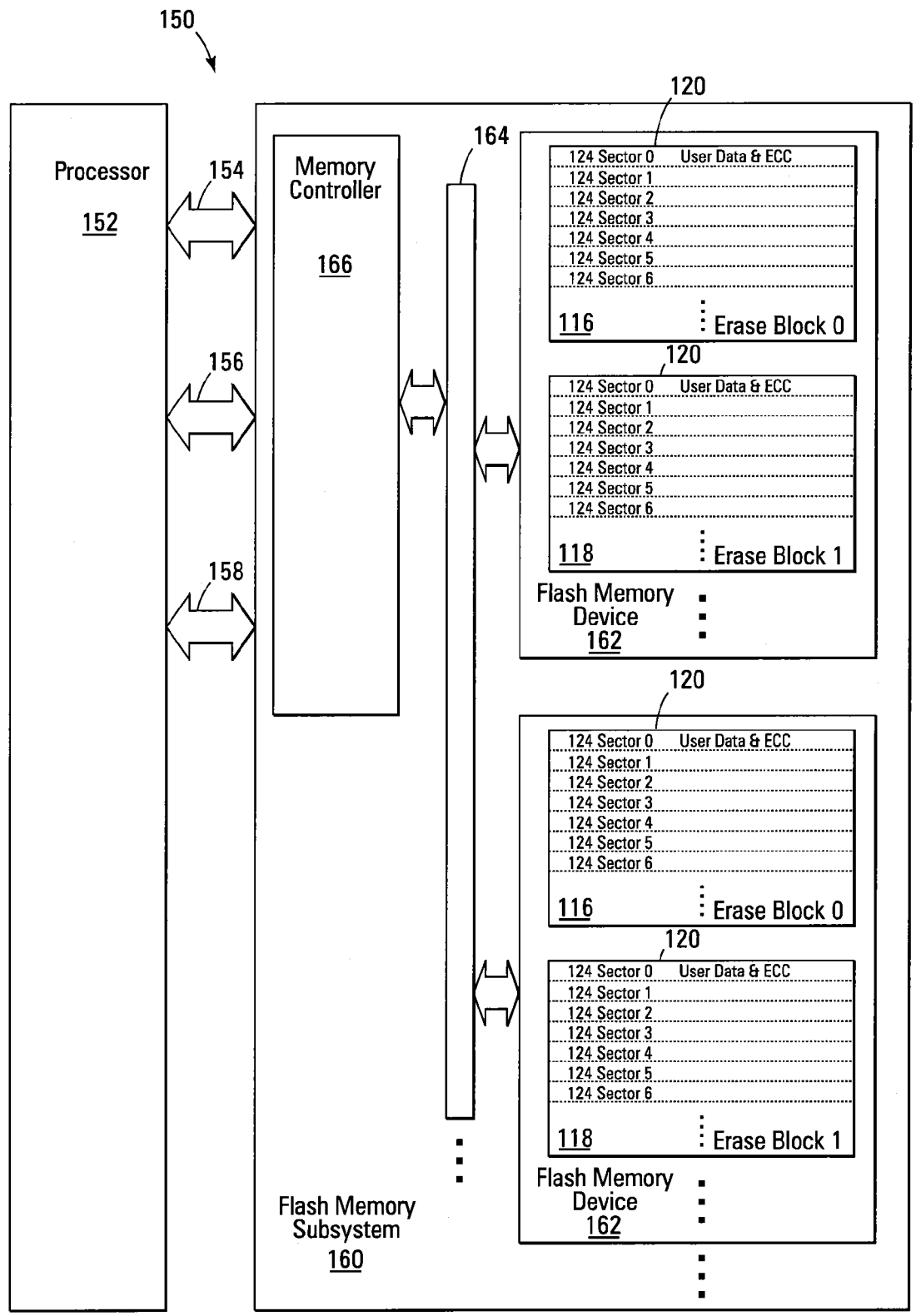

FIG. 1B is a simplified diagram of another system 150 that incorporates a Flash memory system (also know as a memory subsystem) 160 embodiment of the present invention. In the system 150 of FIG. 1B, the Flash memory system 160, such as a memory system or Flash memory card, is coupled to a processor 152 with an address 154, control 156, and data bus 158. Internal to the Flash memory system 160, a memory controller 166 directs internal operation of the Flash memory system 160; managing the Flash memory devices 162, directing data accesses, updating internal control registers and tables (not shown), and/or directing operation of other possible hardware systems (not shown) of the Flash memory system 160. The memory controller 166 is coupled to and controls one or more Flash memory devices 162 via an internal control bus 164. The logical blocks 124 of the one or more Flash memory devices 162 are arranged in clusters and the memory controller 166 has an internal cluster based address translation layer (not shown) that incorporates embodiments of the present invention. The memory controller 166 may optionally incorporate a small local embedded processor to help manage the Flash memory system 160. It is noted that other architectures of Flash memory systems 160, external interfaces 154, 156, 158, and manners of coupling the memory controller 166 to the Flash memory devices 162, such as directly coupled individual control busses and signal lines, are possible and should be apparent to those skilled in the art with benefit of the present disclosure.

The Flash memory devices 162 each contain a sequence of erase blocks 116, 118 in their internal memory arrays. Each erase block 116, 118 contains a series of physical pages 120, each physical page 120 having one or more logical sectors or blocks 124 that contain a user data space and a control/overhead data space (shown here for illustration purposes as a single logical sector/block 124 per physical page/row 120). The overhead data space can contain an ECC code (not shown) and other overhead information for operation of the logical block 120, such as status flags, or an erase block management data field area (not shown).

Figure 2A:
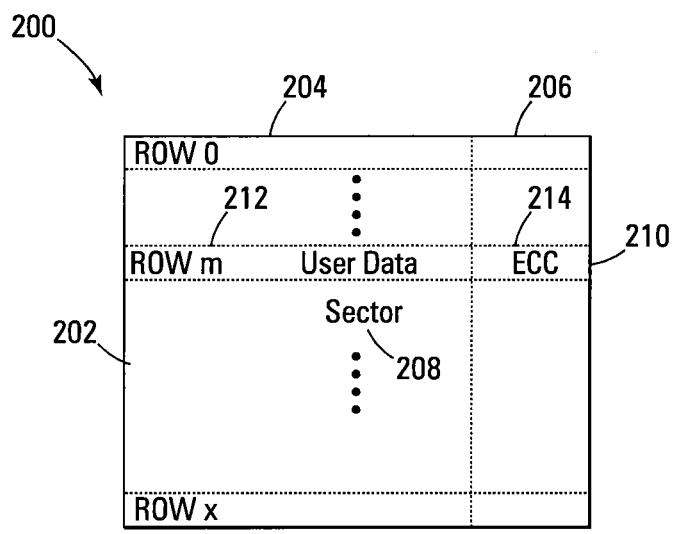
FIGS. 2A and 2B detail encoding of logical address blocks/sectors in Flash memory arrays in accordance with embodiments of the present invention.
Figure 2B:
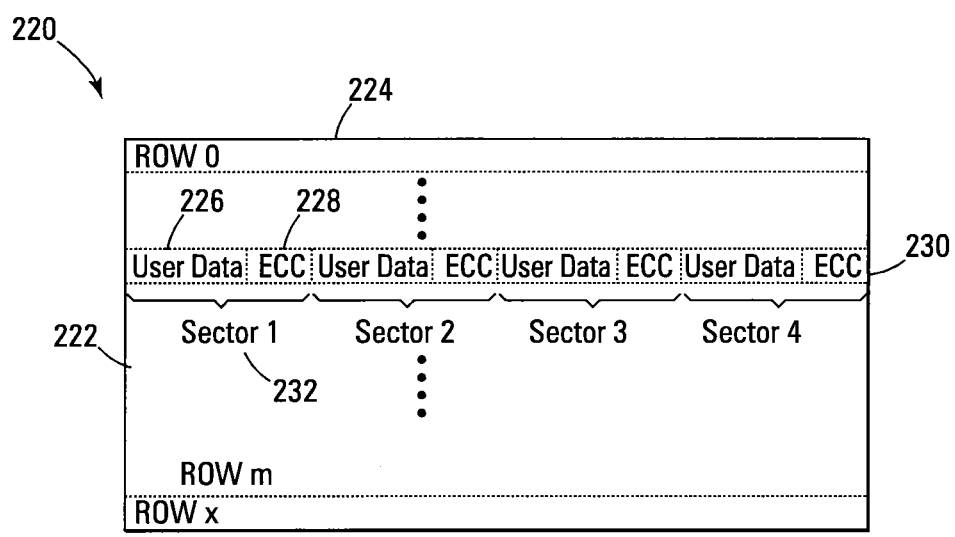

FIGS. 2A and 2B detail encoding 200, 220 of user data into sector/logical blocks of a Flash memory array. In FIG. 2A, user data 212 and header/overhead data 214 is shown in a memory array 202 (or into an erase block N 202 of a memory array), where a single 512-byte logical block is encoded in each physical page/row 210 of the memory array 202. The memory array 202 contains a series of rows 210, each row containing a logical block having a user data area 204 and an overhead data area 206.

In FIG. 2B, user data 226 and header/overhead data 228 is shown in a memory array 222 (or into an erase block N 222 of a memory array), where a multiple logical blocks 232 are encoded in each physical page/row 230 of the memory array 222. As stated above, many memories support multiple logical sectors or logical block 232 within a single physical row page 230. In particular, NAND architecture Flash memories typically utilize this approach due to their generally higher memory cell density and larger row page sizes. The memory row 230 contains multiple logical blocks/sectors 232, each logical block 232 having a user data area 226 and an overhead data/block header section 228. In an example implementation, the row page 230 of FIG. 2B contains 2112 bytes of data (4×512 bytes user data+4×8 bytes ECC+32 bytes for overhead) and is formatted to contain four logical blocks 232 having a user data area 226 of 512-bytes each. The four logical sectors 232 are typically sequentially addressed N, N+1, N+2, and N+3, where N is a base logical sector address for the row page 230. It is noted that the row pages 210 and 230 of FIGS. 2A and 2B are for illustration purposes and that other row page sector formats of differing data sizes, numbers of logical blocks/sectors, and relative positioning of sectors are possible.

As stated above, in an erase block based non-volatile memory, the array is divided into a plurality of individually erasable groups of memory cells called erase blocks, which are each typically further divided into a plurality of 512-byte physical blocks. Before use, the non-volatile memory is formatted to conform to the data structures and management data fields/tables of the file system or memory structure being represented. Each physical block of the memory array also may contain a header or overhead data area that typically includes various data used in the management of the physical block. This management data can include such items as the status of the physical block (valid, erased/available, or to be erased/invalid) and an error correction code (ECC) for the data of the logical block. In addition, the header typically also includes an identifier that identifies the logical block address for the physical block.

As previously stated, the translation layer in conjunction with the erase block management manages the storage of logical blocks in non-volatile memory devices or a non-volatile memory subsystem. The client of a translation layer is typically the file system or operating system of an associated system or processor. The goal of the translation layer/EBM layer is to make the non-volatile memory appear as a freely rewriteable device or magnetic disk/hard drive, allowing the client to read and write logical blocks to the coupled non-volatile memory. It is noted that other translation layers can allow the direct reading and writing of data to a non-volatile memory without presenting the non-volatile memory as a formatted file system.

Figure 3A:
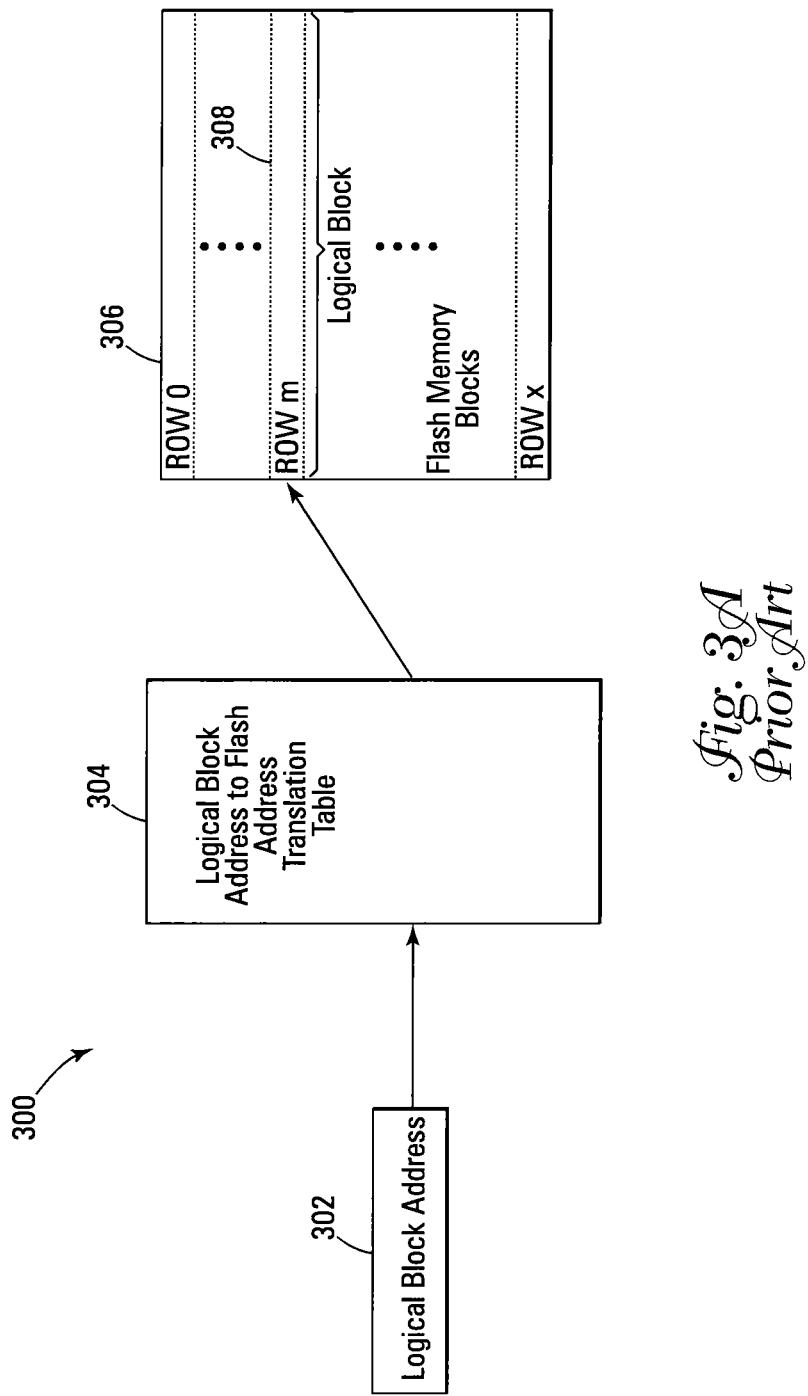
FIG. 3A details a block diagram of a logical block address translation in a memory system of the prior art.

As stated above, in prior art memory systems, the address translation layer translates the accessed logical blocks to a physical block address through the use of a lookup table or, alternatively, through a scan of the physical blocks of the non-volatile memory system or device. FIG. 3A details a simplified block diagram of a prior art lookup table address translation system 300. In FIG. 3A, a logical block address 302 of a logical block read/write access request is submitted to the address translation layer (not shown, but can be either a firmware routine executing on a processor of a system, address translation hardware of a memory controller or in a control circuit internal to the memory itself) which translates it to a physical block address by reference to a lookup table 304, which is typically held in RAM. The address translation system 300 then uses the translated logical address to access the indicated physical block from a row 308 of a non-volatile memory array 306. In a prior art physical scan address translation system, the physical blocks 308 of the memory array 306 would be scanned by the address translation system 300 for a header that contained the matching logical block address 302.

Embodiments of the present invention utilize cluster based logical block/sector to physical block/sector address translation in non-volatile memory devices and memory subsystems. In cluster based addressing and address translation, the non-volatile memory device or non-volatile memory subsystem is divided into a plurality of sequentially addressed clusters, wherein each cluster contains a plurality of sequentially addressed logical blocks or sectors. In one example embodiment, a cluster contains 4 sequential logical blocks. Address translation to translate logical block addresses to physical block addresses is then performed by a table lookup of the logical cluster address of the cluster containing the logical block and returns the base physical address of the cluster in the non-volatile memory. An address offset from the cluster base address or a short physical scan can then be used to access the requested logical block, which is sequentially addressed within the cluster.

Cluster address translation allows close matching of data storage use, in addition, the reduced number of base cluster addresses allows the use of a smaller lookup table that contains only the cluster addresses, allowing a smaller RAM footprint. Physical scanning address translation of the non-volatile memory is also improved by cluster based addressing because of a reduced number of base addresses required to be scanned (logical blocks not on the dividing boundary between clusters/containing the cluster header can be skipped over, permitting the physical scanning to be reduced by a function of cluster granularity).

In one embodiment of the present invention, an individual logical block address is translated to an exact physical block location by taking the logical block address and integer dividing it by the total number of clusters. The result of the integer division is then used to index into the cluster address lookup table. The remainder value is the index to the sector/block (the sector number of the sequential sectors of the cluster) within the selected cluster. The remainder value is multiplied by 512 (512-byte per sector/block) to get the physical address of the sector/block within the non-volatile memory. In another embodiment, where the total number of clusters is a power of 2, the division can be done by simply masking off one or more of the least significant bits of the logical block address (the part of the binary address that relates to the address of the logical block within the cluster) to get the index into the cluster address translation lookup table to retrieve the associated physical cluster base address. The most significant bits can then be masked off to get an index to the logical block in the cluster.

Figure 3B:
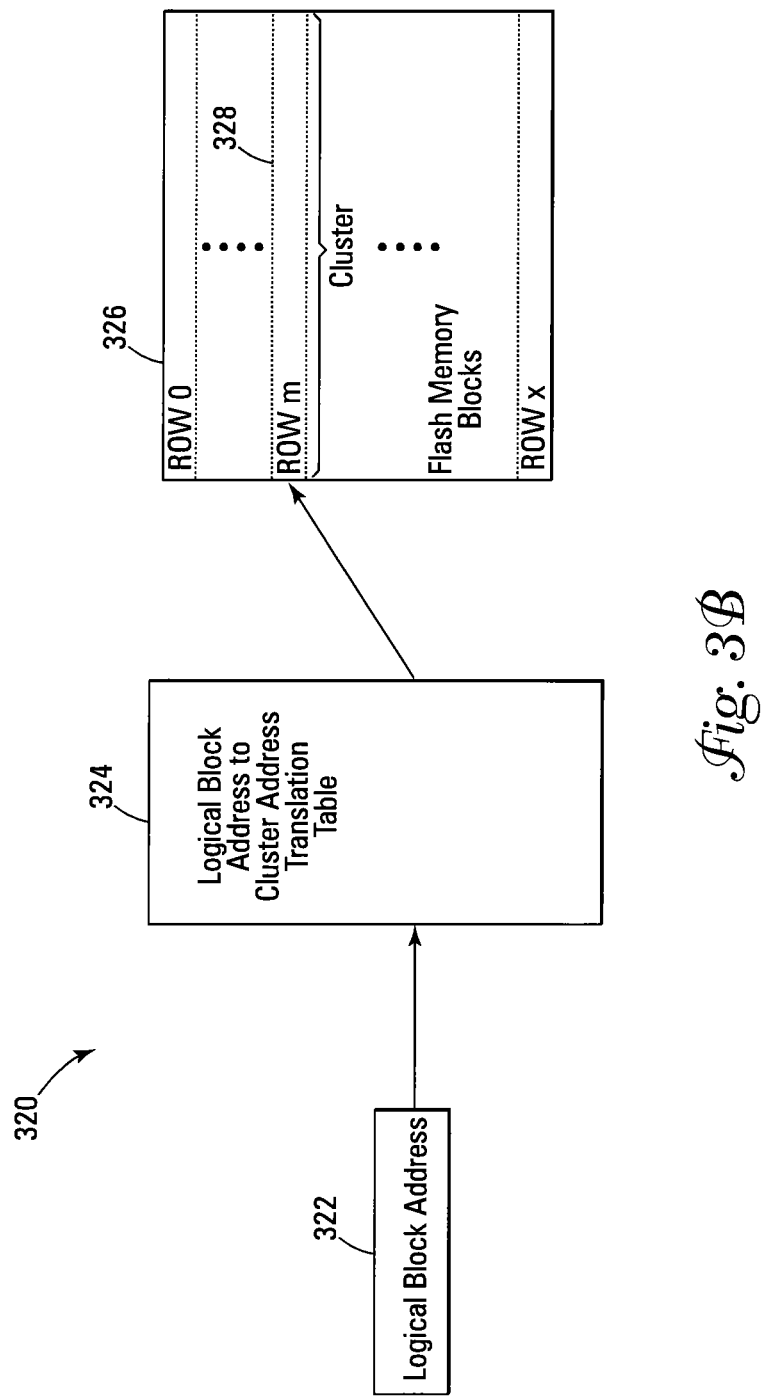
FIGS. 3B and 3C detail block diagrams of cluster based logical block address translation in accordance with embodiments of the present invention.

FIG. 3B details a simplified block diagram of a cluster based lookup table address translation system 320 of an embodiment of the present invention. In FIG. 3B, a logical block address 322 of a logical block read/write access request is submitted to the cluster based address translation layer (not shown) which translates it to a physical cluster address by reference to a cluster address lookup table 324. A logical block address index to the selected logical block within the cluster is also generated. The address translation system 320 then uses the translated cluster address and the logical block index to access the indicated physical block from a row 328 of a non-volatile memory array 326. In a cluster based physical scan address translation system of an embodiment of the present invention, the physical clusters of the memory array 326 would be scanned by the address translation system 320 to locate the logical cluster address that contained the matching logical block address 322.

In one embodiment, the cluster granularity is adjustable and is selected upon memory device formatting or during system design and implementation, allowing for an adjustable number of blocks/sectors per cluster. This allows the non-volatile memory storage to be adjusted to closely match the data type and access usage it will be used for, the physical row size of the non-volatile memory for convenient accessing, the size of the cluster lookup table, and/or the scan time of the physical cluster scan.

In another embodiment of the present invention, a type of specially formatted cluster is utilized to store frequently updated sectors/logical blocks. This allows the cluster based translation layer to avoid the drawback of having to frequently copy, update and invalidate/erase a cluster containing an often updated sector/logical block, potentially causing excessive wear on the non-volatile memory and premature write fatigue failure of the part. In the special frequently updated sector cluster (also known as a page of logical blocks or single sector cluster), the cluster stores a time-wise sequence of a single sector/logical block. A new sequence of physical sectors/blocks of the cluster is written in turn with each new update of the stored logical block and the previous physical block holding the old data is invalidated. This may continue until the entire cluster has been used up, allowing for multiple updates of a logical sector without having to move the cluster and invalidate/erase the cluster containing the old data. In accessing the stored logical block, the address translation layer simply selects the most recently written/not invalid block of the single sector cluster.

Figure 3C:
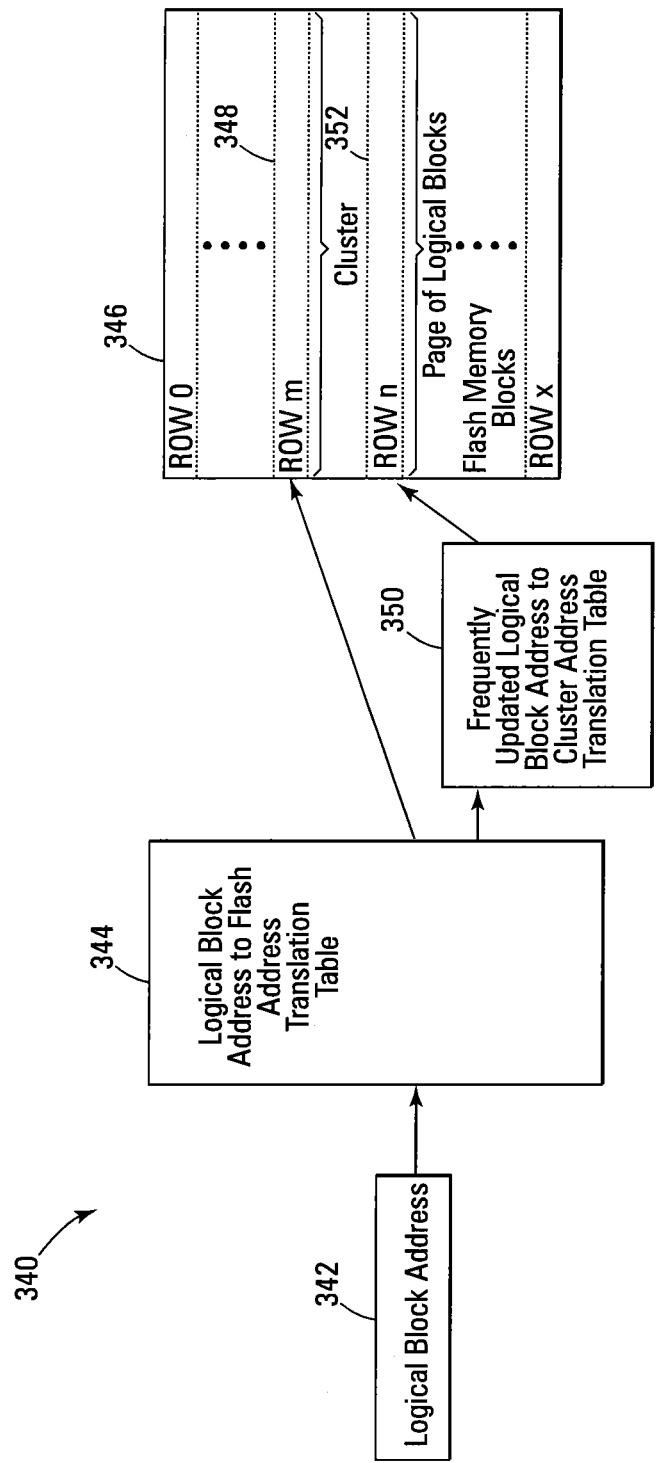

FIG. 3C details a simplified block diagram of a cluster based lookup table address translation system 340 of an embodiment of the present invention that incorporates frequently updated sector cluster addressing. In FIG. 3C, a logical block address 342 of a logical block read/write access request is submitted to the cluster based address translation layer (not shown) which, if it is not a frequently updated sector/logical block, translates it to a physical cluster address by reference to a cluster address lookup table 344. A logical block address index to the selected logical block within the cluster is also generated. The address translation system 340 then uses the translated cluster address and the logical block index to access the indicated physical block from a row 348 of a non-volatile memory array 346. If the logical block address is for a frequently updated logical block/sector, the address lookup is done on a separate logical block address lookup table 350 that only handles address translation for frequently updated logical blocks/sectors. The address translation system 340 then uses the translated cluster address of the physical address from the frequently updated logical block/sector address lookup table 350 to access the indicated cluster/page of logical blocks 352 and select the most recently updated logical block from it, allowing the frequently updated logical blocks to be managed on a separate basis.

In a cluster based lookup table address translation system that incorporates frequently updated sector cluster addressing, the data written to the non-volatile memory is typically all placed in standard clusters and then is promoted to be stored in a frequently updated sector/page of logical blocks cluster 352 upon reaching a threshold level of updates. The threshold level of updates can also be limited in time by ageing the last update, so that promotion only happens to logical blocks that have been recently updated on a frequent basis. It is noted that in one embodiment logical blocks could also be designated to be frequently updated when initially written to the non-volatile memory by the client system. In another embodiment of the present invention, frequently updated logical blocks can also be demoted to a standard cluster storage if they haven't been updated recently or their number of recent updates falls below a moving average threshold level. This allows the specialized frequently updated single sector clusters to be minimized and utilized only on those sectors/blocks that require them. In an alternative embodiment, the frequently updated sectors/blocks are stored individually in a non-cluster basis and not in specialized frequently updated single sector clusters.

Figure 4:
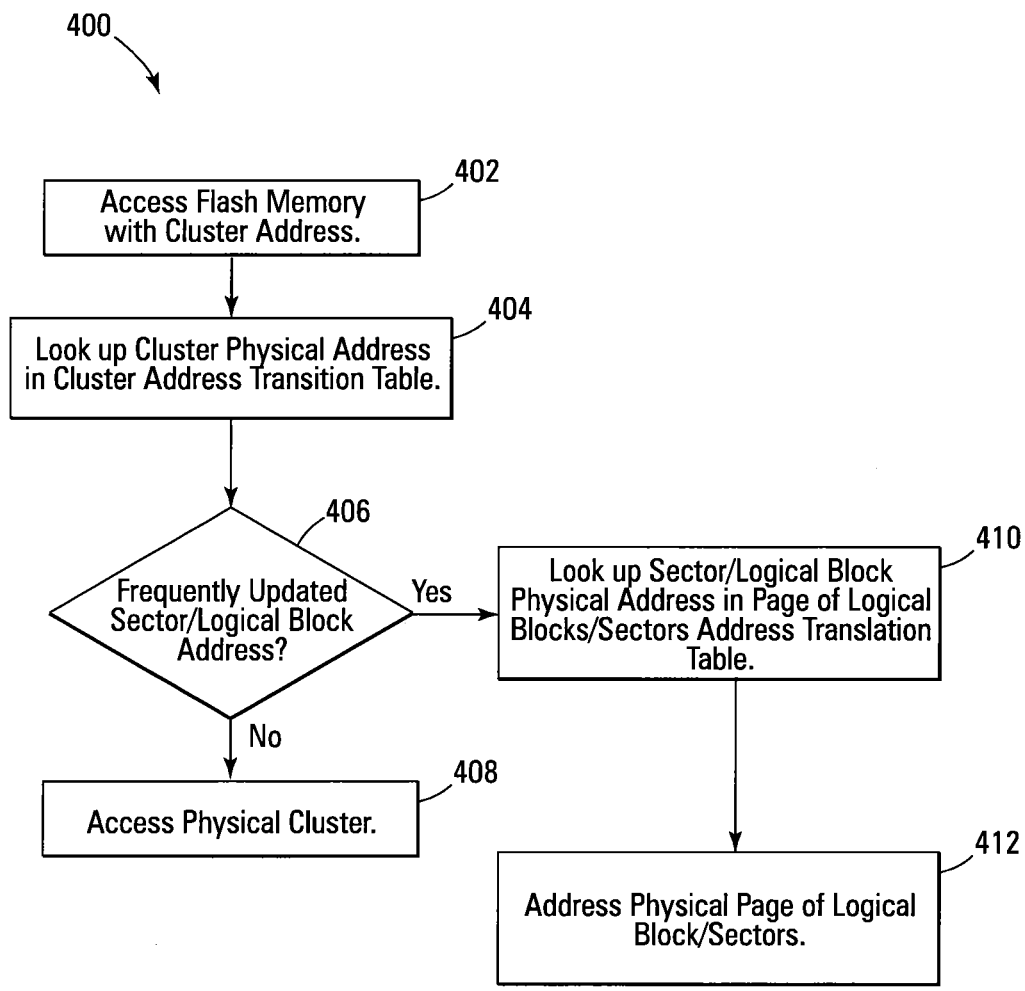
FIG. 4 details detail a flowchart of cluster based logical block address translation in accordance with embodiments of the present invention.

FIG. 4 details a state transition diagram 400 for a cluster based address translation system incorporating frequently updated single sector clusters for non-volatile memory devices of the present invention. As shown in FIG. 4, a logical block address 402 of a logical block read/write access request is submitted to the cluster based address translation layer (not shown) which looks it up in a cluster based address translation table 404. If it is not a frequently updated sector/logical block 406, the address translation system then uses the translated cluster address to access the indicated physical block 408. If the logical block address is for a frequently updated logical block/sector, the address lookup 410 is done on a separate logical block address lookup table that only handles address translation for frequently updated logical blocks/sectors. The address translation system then uses the translated cluster address the physical address from the frequently updated logical block/sector address lookup table to access 412 the indicated frequently updated single sector cluster/page of logical blocks.

It is noted that other cluster based address translation apparatuses and methods incorporating embodiments of the present invention are possible and will be apparent to those skilled in the art with the benefit of this disclosure.

CONCLUSION

An improved non-volatile memory and logical block to physical block address translation utilizing a cluster based addressing scheme has been detailed that enhances operation and helps minimize write fatigue of the memory cells of the non-volatile memory device. Embodiments of the present invention utilize cluster based address translation to translate logical block addresses to physical block addresses, wherein each cluster contains a plurality of sequentially addressed logical blocks. This allows the use of a smaller RAM table for the address translation lookup and/or faster scanning of the memory device or memory subsystem for the matching cluster address. In one embodiment, variable cluster granularity (an adjustable number of blocks/sectors per cluster) allows the non-volatile memory storage to closely match its application and the data that will be stored in it. In another embodiment of the present invention, a specially formatted cluster is utilized for frequently updated sectors/logical blocks, where the cluster stores a single sector/logical block and new sequential physical sectors/blocks of the cluster is written in turn with each new update of the logical block and the previous physical block holding the old data invalidated until the entire cluster has been used. This allows multiple updates of a logical sector without having to move and invalidate/erase the cluster containing the old data, reducing the process of memory cell write fatigue.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of operating a non-volatile memory device, the method comprising:
   dividing the non-volatile memory device into a plurality of sequentially addressed clusters;
   wherein each cluster contains a plurality of sequentially addressed logical blocks, and where at least one cluster of the plurality of sequentially addressed clusters addresses a different number of sequentially addressed logical blocks than another one of the clusters of the plurality of sequentially addressed clusters.

2. The method of claim 1, wherein dividing the non-volatile memory device into a plurality of sequentially addressed clusters further comprises dividing an array of memory cells of the non-volatile memory device into a plurality of sequentially addressed clusters.

3. The method of claim 1, further comprising accessing a logical block of the memory device by reference to a logical cluster address.

4. The method of claim 3, further comprising retrieving a physical address in the non-volatile memory device of the cluster containing the accessed logical block by utilizing a cluster address translation lookup table.

5. The method of claim 1, further comprising adjusting the numbers of sequentially addressed logical blocks of one or more clusters of the plurality of sequentially addressed clusters of the non-volatile memory device.

6. The method of claim 5, further comprising adjusting the numbers of sequentially addressed logical blocks of each cluster of the plurality of sequentially addressed clusters during a format operation performed on the non-volatile memory device.

7. The method of claim 1, further comprising storing a particular logical block in a particular cluster of the plurality of sequentially addressed clusters, where the particular cluster contains a plurality of physical blocks for storage of a single logical block, such that an update of the particular logical block is written to a different physical block of the particular cluster.

8. The method of claim 7, further comprising accessing the particular logical block from the non-volatile memory device utilizing an address translation lookup table different from an address translation lookup table utilized for one or more clusters of the plurality of sequentially addressed clusters other than the particular cluster.

9. A method of operating a non-volatile memory device, the method comprising:
dividing a memory array of the non-volatile memory device into a plurality of sequentially addressed clusters, where each cluster contains one or more sequentially addressed logical blocks;
wherein at least one cluster of the plurality of sequentially addressed clusters addresses a different number of sequentially addressed logical blocks of the memory array than another one of the clusters of the plurality of sequentially addressed clusters.

10. The method of claim 9, further comprising accessing a logical block of the non-volatile memory device by reference to a logical cluster address.

11. The method of claim 10, wherein accessing a logical block of the non-volatile memory device further comprises accessing a logical block by utilizing a cluster address translation lookup table to retrieve a physical cluster address in the non-volatile memory device of the cluster containing the accessed logical block.

12. The method of claim 11, further comprising generating an index into the cluster address translation lookup table to retrieve the physical cluster address by integer dividing the logical block address by the total number of clusters.

13. The method of claim 12, further comprising selecting the logical block within the physical cluster using a remainder of the integer division of the logical block address by the total number of clusters.

14. The method of claim 11, further comprising generating an index into the cluster address translation table to retrieve the physical cluster address by a binary mask of one or more bits comprising the logical block address, where the total number of clusters is a power of 2.

15. The method of claim 9, further comprising storing a particular logical block to one of the clusters of the plurality of sequentially addressed clusters containing more than one sequentially addressed logical blocks until a threshold level of updates of the particular logical block is reached, then storing the particular logical block to a different cluster of the plurality of sequentially addressed clusters containing a plurality of physical blocks for storage of a single logical block.

16. A method of operating a non-volatile memory device, the method comprising:
dividing the non-volatile memory device into a plurality of sequentially addressed clusters, where each cluster contains one or more sequentially addressed logical blocks; and
accessing logical blocks in the non-volatile memory device by reference to a logical cluster address;
wherein at least one cluster of the plurality of sequentially addressed clusters addresses a different number of sequentially addressed logical blocks than another one of the clusters of the plurality of sequentially addressed clusters.

17. The method of claim 16, wherein accessing logical blocks in the non-volatile memory device by reference to a logical cluster address further comprises accessing one or more logical blocks by utilizing a cluster address translation lookup table to retrieve a physical address in the non-volatile memory device of the cluster containing the accessed logical block.

18. The method of claim 16, further comprising storing one or more frequently updated logical blocks having a level of updates above a threshold separately from non-frequently updated logical blocks having a level of updates below the threshold.

19. The method of claim 18, further comprising storing the one or more frequently updated logical blocks in one or more specialized clusters, where each of the one or more specialized clusters contains a plurality of physical blocks for storage of a single logical block, such that an update of the stored logical block of a particular specialized cluster is written to a new unused physical block of that specialized cluster.

20. The method of claim 18, further comprising accessing the one or more frequently updated logical blocks utilizing an address translation lookup table different from an address translation lookup table utilized for the non-frequently updated logical blocks.

\* \* \* \* \*